(12) United States Patent
Fore, III (10) Patent No.: US 11,371,252 B2
(45) Date of Patent: Jun. 28, 2022

(54) SYSTEMS AND METHODS OF CONCRETE APPARATUS WITH INCORPORATED LIFTER

(71) Applicant: PF3 Global, LLC, Gulfport, MS (US)

(72) Inventor: Pat Halton Fore, III, Gulfport, MS (US)

(73) Assignee: PF3 Global LLC, Gulfport, MS (US)

(*) Notice: Subject to any disclaimer, the term of this patent is extended or adjusted under 35 U.S.C. 154(b) by 0 days.

(21) Appl. No.: 16/032,071

(22) Filed: Jul. 11, 2018

(65) Prior Publication Data
US 2020/0123794 A1    Apr. 23, 2020

(51) Int. Cl.
| | | |
|---|---|---|
| *E04G 21/14* | (2006.01) | |
| *E04C 5/16* | (2006.01) | |
| *E04C 2/00* | (2006.01) | |
| *E04C 2/04* | (2006.01) | |
| *F16L 9/08* | (2006.01) | |

(52) U.S. Cl.
CPC .............. *E04G 21/142* (2013.01); *E04C 5/16* (2013.01); *F16L 9/085* (2013.01); *E04C 2/044* (2013.01); *E04C 2002/002* (2013.01)

(58) Field of Classification Search
CPC ... E04G 21/142; E04C 5/16; E04C 2002/002; E04C 2/044; E04C 5/203; E04C 5/0604; F16L 9/085
See application file for complete search history.

(56) References Cited

U.S. PATENT DOCUMENTS

| | | | | |
|---|---|---|---|---|
| 4,821,994 A | * | 4/1989 | Fricker | B28B 23/005 |
| | | | | 249/91 |
| 5,924,458 A | * | 7/1999 | Kaines | B21F 15/06 |
| | | | | 138/172 |
| 8,533,956 B2 | * | 9/2013 | Perry | E04C 5/0604 |
| | | | | 29/897.34 |
| 2007/0186492 A1 | * | 8/2007 | Bennett | E04G 21/142 |
| | | | | 52/125.4 |
| 2015/0021821 A1 | * | 1/2015 | Fore, III | B28B 17/00 |
| | | | | 264/273 |

FOREIGN PATENT DOCUMENTS

| | | | | |
|---|---|---|---|---|
| WO | WO 88/09849 | * | 12/1998 | E02D 29/02 |
| WO | WO 2016/061627 | * | 4/2016 | E04C 5/06 |

* cited by examiner

*Primary Examiner* — Timothy Kennedy
*Assistant Examiner* — Olukorede Esan
(74) *Attorney, Agent, or Firm* — Benjamin Balser; Next IP Law Group (57) ABSTRACT

Systems and methods for a concrete apparatus with incorporated lifter are provided. A concrete apparatus is formed by placing a reinforcement system in a mold. The reinforcement system comprises a lifter. Concrete is poured into the mold such that the lifter protrudes from the poured concrete. After the concrete has hardened and the mold is removed, the lifter is used to carry and position the concrete apparatus. After the concrete apparatus is positioned, the lifter is removed at the circumference of the concrete apparatus leaving no holes, thereby eliminating water leakage due to lifting methods.

20 Claims, 10 Drawing Sheets

SYSTEMS AND METHODS OF CONCRETE APPARATUS WITH INCORPORATED LIFTER

CROSS REFERENCE TO RELATED APPLICATION

This application is a continuation in part application of U.S. patent application Ser. No. 14/492,431 filed on Sep. 22, 2014, which is a divisional application of U.S. patent application Ser. No. 12/421,337 filed on Apr. 9, 2009, entitled "Systems and Methods of Concrete Apparatus with Incorporated Lifter," which are all incorporated by reference herein.

TECHNICAL FIELD

The present disclosure is generally related to concrete fabrication and, more particularly, is related to precast concrete apparatus.

BACKGROUND

Precast concrete is a form of construction, where concrete is cast in a reusable mold or "form" which is then cured in a controlled environment, transported to the construction site and lifted into place. In contrast, standard concrete is poured into site specific forms and cured on site. Precast stone is distinguished from precast concrete by using a fine aggregate in the mixture so the final product approaches the appearance of naturally occurring rock or stone.

By producing precast concrete in a controlled environment (typically referred to as a precast plant), the precast concrete is afforded the opportunity to properly cure and to be closely monitored by plant employees. Many states across the United States require a precast plant to be certified (either by NPCA or PCI) for a precast producer to supply their product to a construction site sponsored by State and Federal Departments of Transportation (DOTs).

Ancient Roman builders made use of concrete and soon poured the material into molds to build their complex network of aqueducts, culverts and tunnels. Modern uses for precast technology include a variety of architectural and structural applications featuring parts of or an entire building system. Precast architectural panels are also used to clad all or part of a building facade, free-standing walls used for landscaping, soundproofing and security walls. Storm water drainage, water and sewage pipes and tunnels make use of precast concrete units. The advantages of using precast concrete is the increased quality of the material, when formed in controlled conditions, and the reduced cost of constructing large forms used with concrete poured on site.

There are many different types of precast concrete forming systems for architectural applications, differing in size, function and cost.

SUMMARY

Example embodiments of the present disclosure provides systems of concrete apparatus with incorporated lifter. Briefly described, in architecture, one example embodiment of the apparatus, among others, can be implemented as follows: a reinforcement cage; and at least one lifter, the at least one lifter an incorporated lengthened portion of the reinforcement cage.

Example embodiments of the present disclosure can also be viewed as providing systems of concrete apparatus with incorporated lifter. In this regard, one embodiment of such a system, among others, can be broadly summarized by the following: a concrete mold configured to accept: a reinforcement cage, the reinforcement cage comprising at least one lifter, the at least one lifter an incorporated lengthened portion of the reinforcement cage; and concrete for molding around the reinforcement cage.

Example embodiments of the present disclosure can also be viewed as providing systems of concrete apparatus with incorporated lifter. In this regard, one embodiment of such a system, among others, can be broadly summarized by the following: a reinforcement cage comprising at least one lifter, the at least one lifter an incorporated lengthened portion of the reinforcement cage; and a concrete mold configured to accept the reinforcement cage.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Concrete is the world's most commonly used building material. In its simplest form, concrete may be a mixture of paste and aggregates. The material (paste) used to manufacture concrete pipe may be composed principally of cement and water, and may be used to coat the surface of the fine and coarse aggregates. The cement may be a closely controlled chemical combination of calcium, silicon, aluminum, iron, and small amounts of other compounds, to which gypsum may be added in the final grinding process to regulate the setting time of the concrete. The cement's chemistry comes to life in the presence of water. Soon after the cement and water are combined, hydration occurs and the paste hardens and gains strength to form a rock-like mass, the concrete. During hydration, a node forms on the surface of each cement particle. The node grows and expands until it links up with nodes from other cement particles or adheres to adjacent aggregates. Within this process lies the key to concrete—it's plastic and malleable when newly mixed and strong and durable when hardened.

The character of the concrete may be determined by the quality of the paste. The strength of the paste, in turn, may depend on the ratio of water to cement. The water-cement ratio is the weight of the mixing water divided by the weight of the cement. High-quality concrete may be produced by lowering the water-cement ratio as much as possible without sacrificing the workability of fresh concrete. Generally, using less water produces a higher quality concrete provided the concrete is properly placed, consolidated, and cured. Typically, a mix may be about 10 to 15 percent cement, 60 to 75 percent aggregate and 15 to 20 percent water. Entrained air in many concrete mixes may also take up another 5 to 8 percent.

Almost any natural water that is drinkable and has no pronounced taste or odor may be used as mixing water for concrete. However, some waters that are not fit for drinking may be suitable for concrete. Specifications usually set limits on chlorides, sulfates, alkalis, and solids in mixing water unless tests can be performed to determine what effect the impurity has on various properties.

The type and size of the aggregate mixture depends on the thickness and purpose of the final concrete product. A continuous gradation of particle sizes is desirable for efficient use of the paste. In addition, aggregates are preferably clean and free from any matter that might affect the quality of the concrete.

Curing may begin after the exposed surfaces of the concrete have hardened sufficiently to resist marring. Curing ensures the continued hydration of the cement and the strength gain of the concrete. Concrete surfaces may be cured by steam or water. The longer the concrete is kept moist, the stronger and more durable it will become. The rate of hardening may depend upon the composition and fineness of the cement, the mix proportions, and the moisture and temperature conditions. Most of the hydration and strength gain may take place within the first month of concrete's life cycle, but hydration continues at a slower rate for many years. Concrete continues to get stronger as it gets older.

Precast concrete products may be cast in a factory setting. Precast concrete products may benefit from tight quality control achieved at a production plant. Precast concrete pipe may be produced in highly controlled plant environments under rigid production standards and testing specifications. Previous methods of moving precast concrete pipe have involved leaving a hole in the precast concrete pipe, inserting a lifting means in the hole and using the lifting means to move the precast concrete pipe into position. After the precast concrete pipe was moved into position, the lifting means was removed and the hole is plugged. The hole may be a source for leaking and weakness in the precast concrete pipe. However, using the apparatus and methods of precast concrete device with incorporated lifter disclosed herein, the hole in the concrete pipe is eliminated such that the concrete pipe isn't weakened, and is actually strengthened compared to the previous lifting methods.

Figure 1:
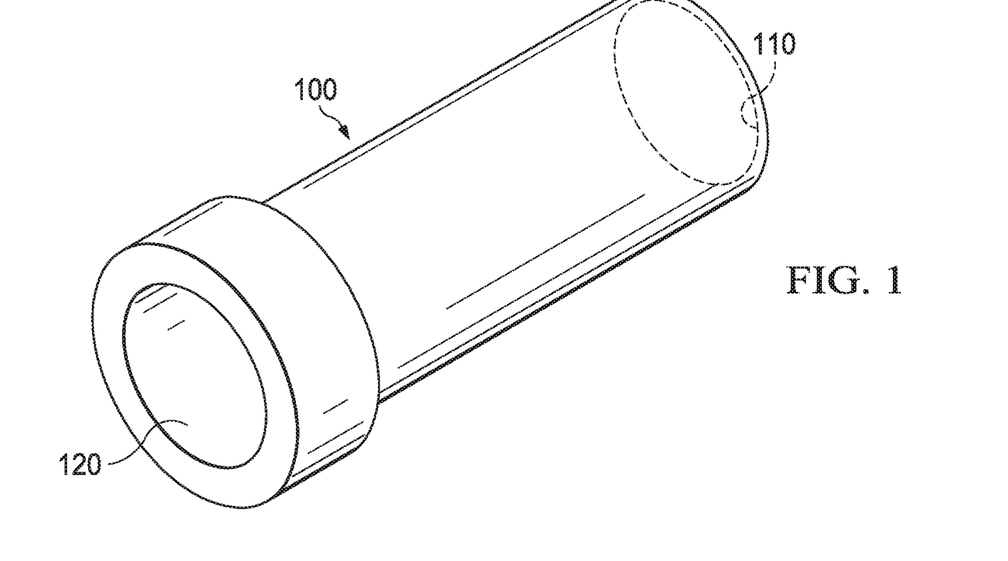
FIG. 1 is a diagram of an example embodiment of a concrete device.

FIG. 1 provides an example embodiment of precast concrete pipe 100. It should be noted that, although an example of a concrete pipe is used in this disclosure, the methods and systems disclosed herein may be applicable in any type of precast concrete device. Concrete pipe 100 is shown with a first end 120 and a second end 110. Although this pipe is shown as a hollow pipe, the pipe could be solid, or the device could alternatively be a precast culvert, pullbox, catch basin, retaining wall, manhole sections, and building panel, as non-limiting examples. Concrete pipe 100 is shown to be straight and circular, but may be elliptical, arched, bent, and curved, as non-limiting examples.

Figure 2:
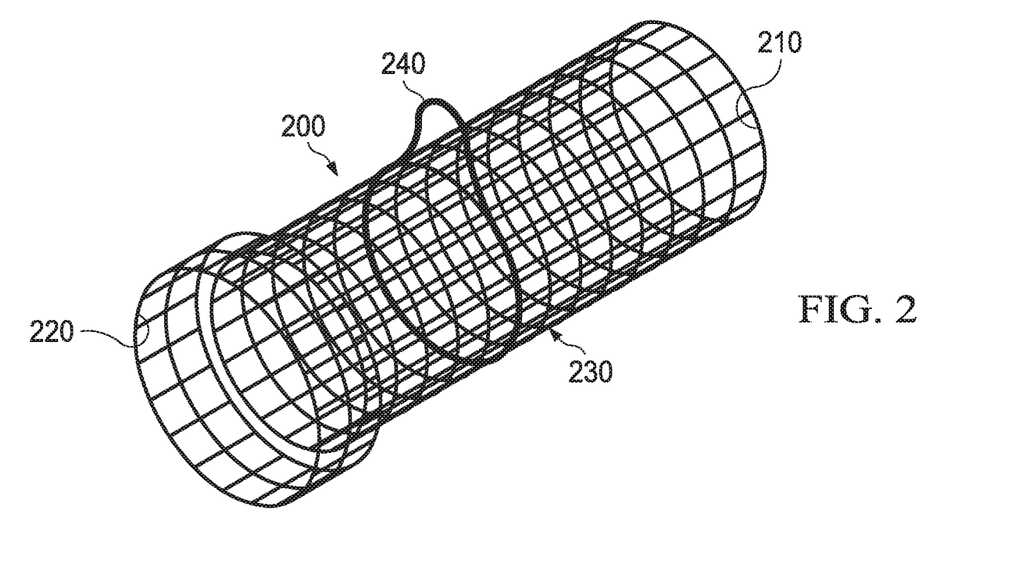
FIG. 2 is a diagram of an example embodiment of a reinforcement structure with incorporated lifter used in the concrete device of FIG. 1.
Figure 2A:
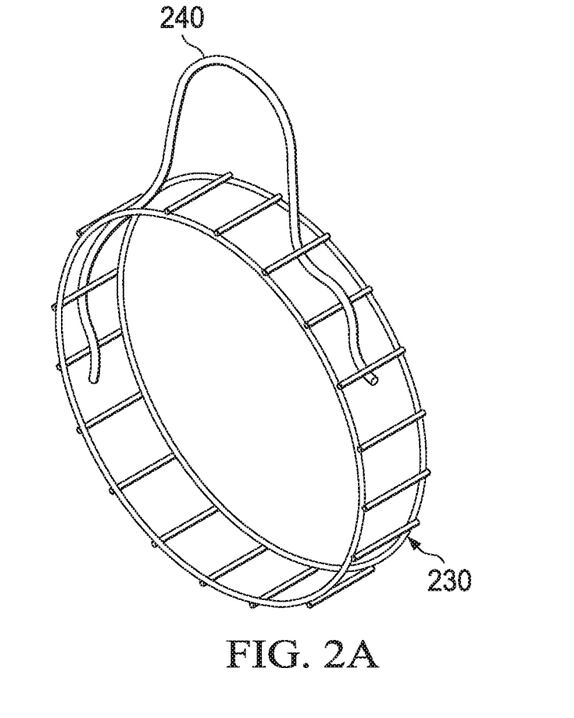
FIG. 2A is a diagram of an example embodiment of the lifter of FIG. 2 incorporated by interweaving in an over and under method.

FIG. 2 provides an example embodiment of reinforcement system 200. This example embodiment of reinforcement system 200 comprises reinforcement cage 230 with a first open end 220 and a second open end 210. Reinforcement cage 230 may be constructed of steel, fiber, and fiber-reinforced plastic as non-limiting examples. As provided in FIG. 2A, lifter 240 is incorporated to provide lifting functionality after concrete is poured around reinforcement cage 230. Lifter 240 is placed such that lifter 240 protrudes past the outer diameter of concrete pipe 100. Lifter 240 may be separate from reinforcement cage 230 or it may be an integrated part of reinforcement cage 230. Lifter 240 may be incorporated into reinforcement cage 230 by interweaving in an over and under method. Lifter 240 extends out from reinforcement cage 230, and may be a lengthened piece of reinforcement cage 230 or a slackened piece of reinforcement cage 230 as non-limiting examples. Lifter 240 may be comprised of galvanized steel or any other material which is strong enough to support the weight of concrete pipe 100. Regarding the use of the galvanized lifter cable, the galvanized cable will not rust and it is easy to use. Additionally, no further attachments are necessary.

Figure 3:
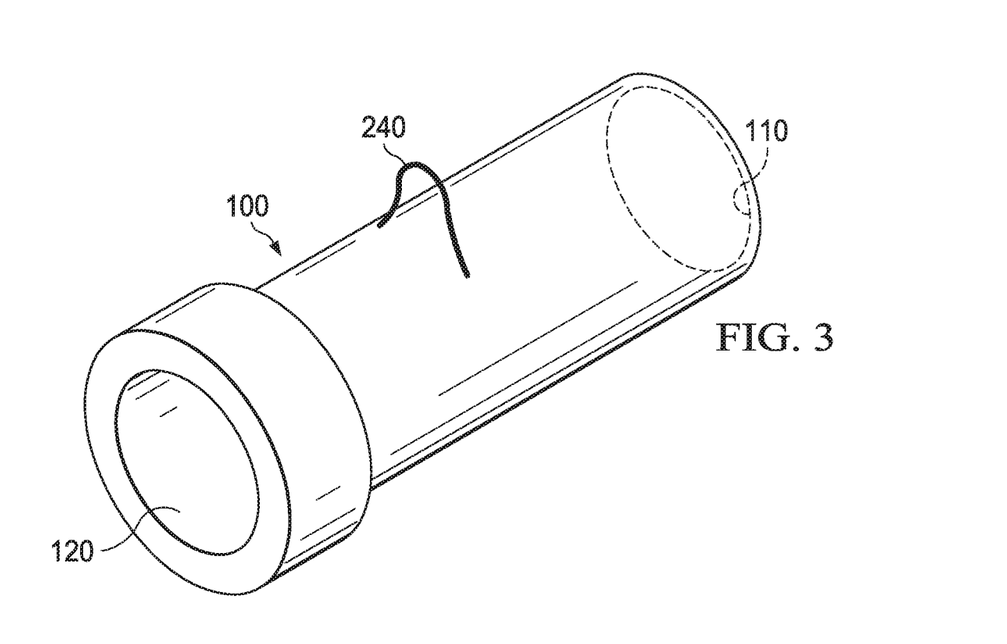
FIG. 3 is a diagram of an example embodiment of the concrete device of FIG. 1 with the lifter of FIG. 2.

Reinforcement system 200 is placed in a concrete mold (not shown) and concrete is poured into the mold encasing reinforcement system 200. Once the concrete is poured into the mold, lifter 240 may be folded down until the mold is removed and lifter 240 springs up for lifting. FIG. 3 provides concrete pipe 100 after the mold has been removed with lifter 240 protruding from concrete pipe 100. Lifter 240 makes for a safe and easy way to lift, transport, and lay concrete pipe 100.

Figure 4:
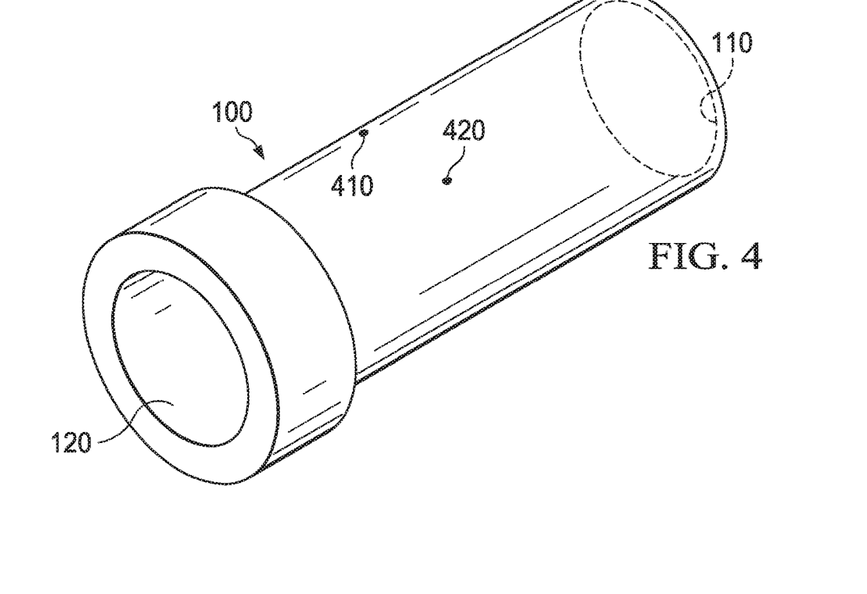
FIG. 4 is a diagram of an example embodiment of the concrete device of FIG. 3 with the lifter removed at the outer circumference of the concrete device.

After pipe 100 is laid in a desired position, lifter 240 may be left in position. In an alternative embodiment, however, lifter 240 may be removed. FIG. 4 provides concrete pipe 100 with the protruding section of lifter 240 detached at points 410, 420 on the outer surface of concrete pipe 100. If lifter 240 is a galvanized cable, lifter 240 may be severed with a cable cutter or other detachment means. By severing lifter 240 at the outer surface of concrete pipe 100, lifting holes and water leakage may be reduced or substantially eliminated.

Figure 5:
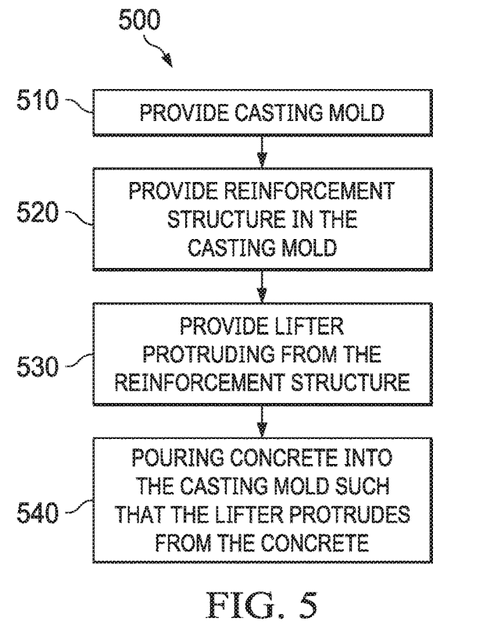
FIG. 5 is a flow diagram of an example embodiment of a method of manufacturing the concrete device of FIG. 3.

FIG. 5 provides a flow chart of an example embodiment of method 500 of manufacturing a concrete device with an incorporated lifter. In block 510 of method 500, a casting mold is provided. In block 520, a reinforcement structure is provided in the casting mold. In block 530, a lifter is provided, the lifter protruding from the reinforcement structure. In block 540, concrete is poured into the casting mold such that the lifter protrudes from the concrete.

Figure 6:
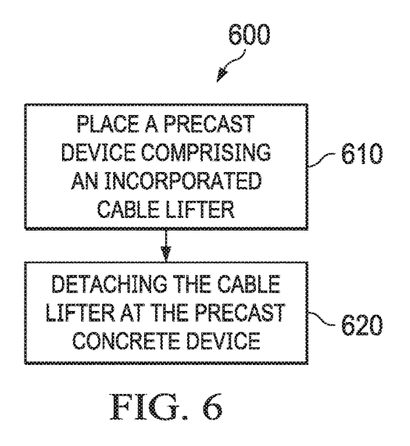
FIG. 6 is a flow diagram of an example embodiment of a method of using the concrete device of FIG. 3.

FIG. 6 provides method 600 of using a concrete device with incorporated lifter. In block 620 a precast concrete device is placed, the precast concrete device comprising an incorporated cable lifter. In block 620, the cable lifter is detached at the perimeter of the precast concrete device.

Figure 7:
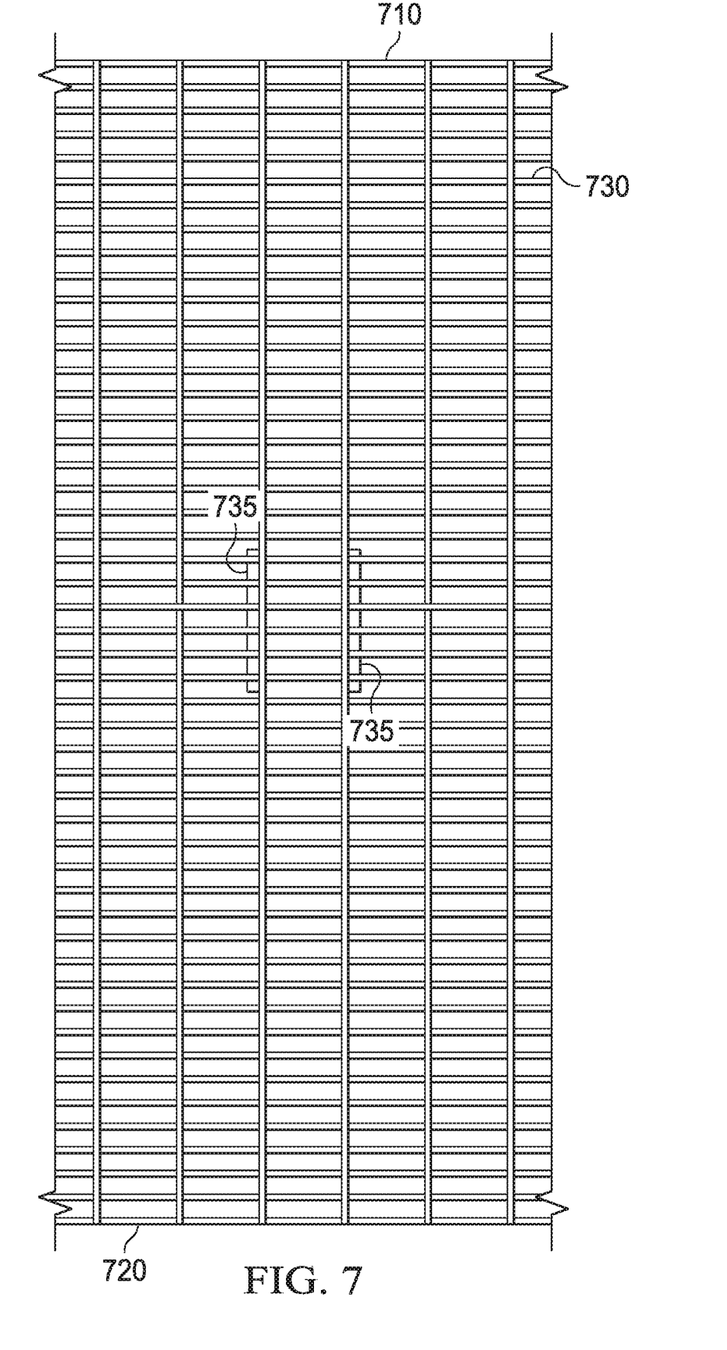
FIG. 7 provides a diagram of a reinforcement cage with rebar installed.

In an example embodiment of a method of installing a lifter, first a reinforcement cage is formed. Example standards for cages include but are not limited to ASTM C-76, AASHTO M170, ASTM C-506, and AASHTO M-206. After the reinforcement cage is formed, rebar may be attached to further reinforce the area where the lifter is installed. Table 1 provides example sizes and placements based on the size of a round pipe, for example, in reference to the round pipe of FIG. 7 Reinforcement cage 730 comprises spigot end 710 and bell end 720. The spigot end of a first pipe may fit into the bell end of a second pipe. Rebar pieces 735 may be sized and located per Table 1, though other sizing and locations may be used. In Table 1, Round Size is the diameter of a round pipe, Rebar Size is the size of the rebar material, Rebar Length is the length of the rebar material, and Rebar Spacing is the space between the attachment of more than one piece of rebar.

TABLE 1

| Round Size | Rebar Size | Rebar Length | Rebar Spacing |
|---|---|---|---|
| 12" | #3 | 10"-18" | 6" |
| 15" | #3 | 10"-18" | 6" |
| 18" | #3 | 10"-18" | 6" |
| 24" | #3 | 10"-18" | 6" |
| 30" | #3 | 10"-18" | 6" |
| 36" | #4 | 10"-18" | 8"-9" |
| 42" | #4 | 10"-18" | 10" |
| 48" | #4 | 10"-18" | 10" |
| 54" | #4 | 10"-18" | 10" |
| 60" | #4 | 10"-18" | 10" |
| 72" | #4 | 10"-18" | 10" |

When the rebar size and location is determined, the rebar may be welded to one or more of the circumferential bars (that go around the cage), but preferably at least two. In an example embodiment, the rebar is welded on the inside of the circumferential bars the inside of the longitudinal bars. However, in an alternative embodiment, the rebar is welded on the outside of the circumferential bars. When multiple cages are used in a structure, the rebar may be welded on the inside of the circumferential bars of the inside cage. In an alternative embodiment with multiple cages, the rebar may be welded on the inside of the circumferential bars of the outside cage. Although, the spacing of the rebar may match the vertical bar spacing of the reinforcing cage, the spacing may also differ. In an example embodiment, the rebar is attached to the reinforcing cage by welding. In an alternative embodiment, the rebar may be tied, clipped, or secured in any manner to hold it in place on the reinforcing cage. Although, #3 and #4 bars are listed in Table 1, the rebar sizes and lengths may vary depending on the application. Table 1 is listed merely for guidance.

The lifting cable diameter and length may be chosen according to Table 2, as a non-limiting example. In Table 2, Round Size is the diameter of a round pipe, Cable Diameter is the diameter of the lifting cable, Cable Length is the length of the lifting cable, and B and C wall refers to the wall thickness of the pipe (such as A, B, and C, where B and C are the most common). A lifting cable may be used in all three wall thicknesses.

TABLE 2

| Round Size | Cable Diameter | Cable Length |
|---|---|---|
| 12" | ⅜ | 44"(B-wall) 54"(C-wall) |
| 15" | ⅜ | 44"(B-wall) 54"(C-wall) |
| 18" | ⅜ | 44"(B-wall) 54"(C-wall) |
| 24" | ⅜ | 44"(B-wall) 54"(C-wall) |
| 30" | ⅜ | 44"(B-wall) 54"(C-wall) |
| 36" | ½ | 74"(B-wall) 74"(C-wall) |
| 42" | ½ | 74"(B-wall) 74"(C-wall) |
| 48" | ½ | 74"(B-wall) 74"(C-wall) |
| 54" | ¾ | 96"(B-wall) 96"(C-wall) |
| 60" | ¾ | 96"(B-wall) 96"(C-wall) |
| 72" | ¾ | 96"(B-wall) 96"(C-wall) |

The lifting cable may be woven into the reinforcing cage, behind the added rebar, and over and under each horizontal bar between the vertical (circumferential) bars. A weaving method may be used so that the lifting cable does not easily pull out of the concrete. The weaving makes it tighten down and "grab" itself. Alternative methods of holding the cable in the concrete include a cable clamp and welding the lifting cable to the reinforcement cage.

Figure 8:
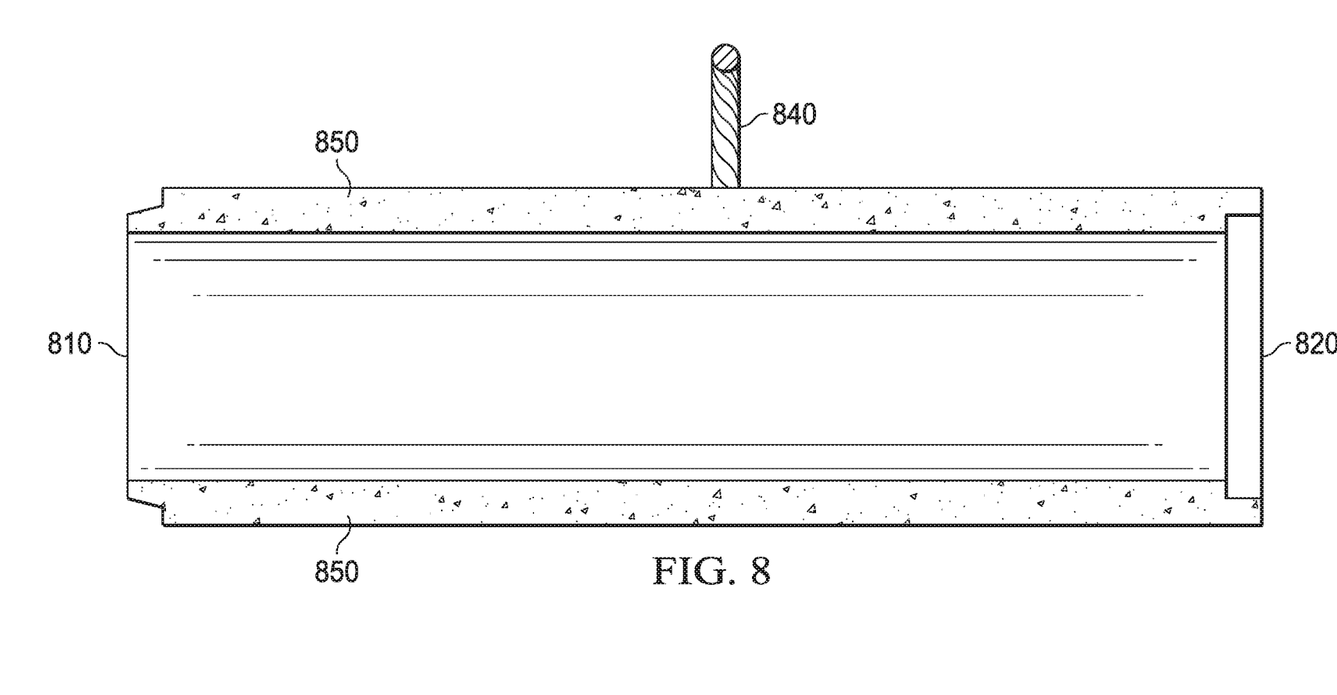
FIG. 8 provides a length-wise cut-away diagram of a concrete pipe with lifting cable installed.

In an example embodiment, the lifting cable forms a loop or lifting eye as shown in FIG. 8, in which lifting eye/loop/lifting cable 840 protrudes beyond the outside of walls 850. In an example embodiment, lifting eye 840 is positioned at the midpoint between spigot end 810 and bell end 820. When laying pipe, the balance of the pipe should be tilted towards the spigot end. The offset of the lifting point from the midpoint of the pipe may achieve the desired tilting. The size and length of the cable may be determined according to Table 3 as a non-limiting example. In Table 3, Size is the inside diameter of the pipe, Wall is the wall thickness, Length is the length of the pipe (and may vary), D-1 is distance from outside wall of the pipe to the inside of the lifting cable, D-2 is the distance from the end of the bell of the pipe to the center of the lifting cable, Cable Dia. is the diameter of the lifting cable, Cable Length (B Wall) is 44", and Cable Length (C Wall) is 54".

TABLE 3

| Size | Wall | Length | D-1* | D-2** | Cable Dia. | Cable Length (B-wall) | Cable Length (C-wall) |
|---|---|---|---|---|---|---|---|
| 12" | B/C | 8"-10" | 4" | 47" | 3/8" | 44" | 54" |
| 15" | B/C | 8"-10" | 4" | 47" | ⅜" | 44" | 54" |
| 18" | B/C | 8"-10" | 4" | 47" | ⅜" | 44" | 54" |
| 24" | B/C | 8"-10" | 4" | 47" | ⅜" | 44" | 54" |
| 30" | B/C | 8"-10" | 4" | 47" | ⅜" | 44" | 54" |
| 36" | B/C | 8"-10" | 5" | 47" | ½" | 74" | 74" |
| 42" | B/C | 8"-10" | 5" | 47" | ½" | 74" | 74" |
| 48" | B/C | 8"-10" | 5" | 47" | ½" | 74" | 74" |
| 54" | B/C | 8"-10" | 6" | 47" | ¾" | 96" | 96" |
| 60" | B/C | 8"-10" | 6" | 47" | ¾" | 96" | 96" |
| 72" | B/C | 8"-10" | 6" | 47" | ¾" | 96" | 96" |

*Measured from the outside wall of the pipe to the inside of the Lifting Eye. Tolerance is +/−⅜"
**Measured from the end of the bell to the center of the Lifting Eye. Tolerance is +/−½"

Figure 9:
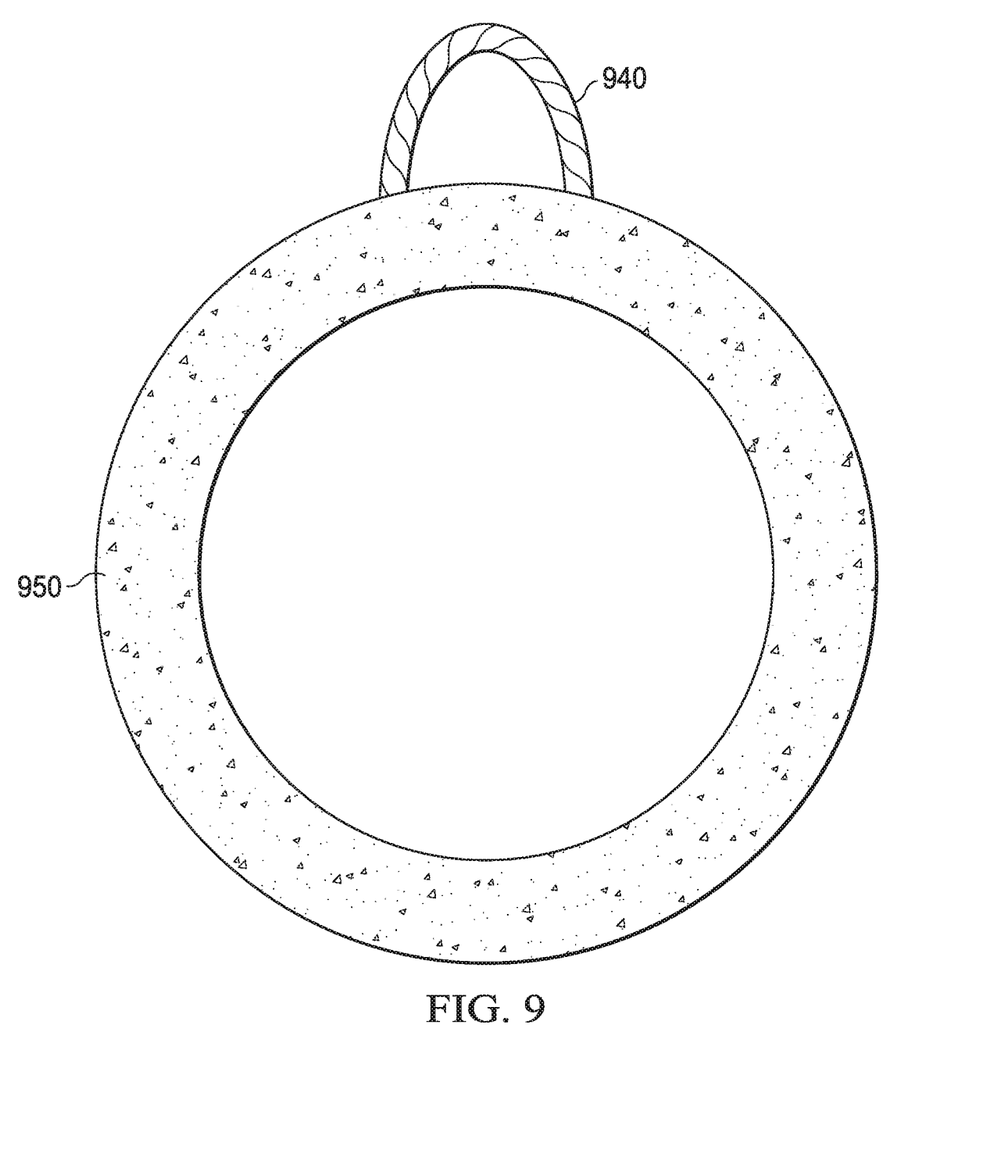
FIG. 9 provides a cross-wise cut-away diagram of a round concrete pipe with lifting cable installed.

FIG. 9 provides a cross-sectional view of an example round pipe structure with lifting cable 940 protruding from pipe wall 950.

Figure 10:
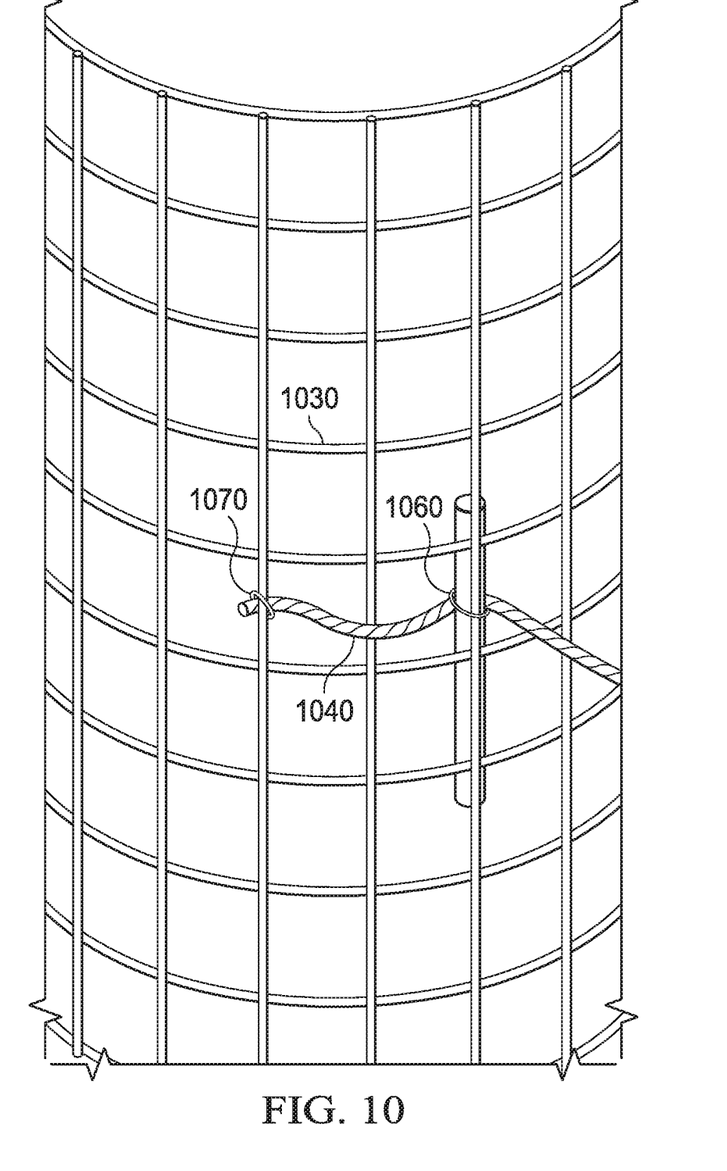
FIG. 10 provides a diagram of a reinforcement cage with lifting cable installed.

In an example embodiment, as provided in FIG. 10, lifting cable 1040 is attached to reinforcing cage 1030 by cable ties such as cable ties 1060, 1070. Cable tie 1060 attaches lifting cable 1040 to reinforcing cage 1030 at the rebar attachment. Cable tie 1070 attaches lifting cable 1040 to reinforcing cage 1030 at or near the end of the cable. Lifting cable 1040 may be tied to reinforcing cage 1030 at both pieces of rebar and at both ends.

Figure 11:
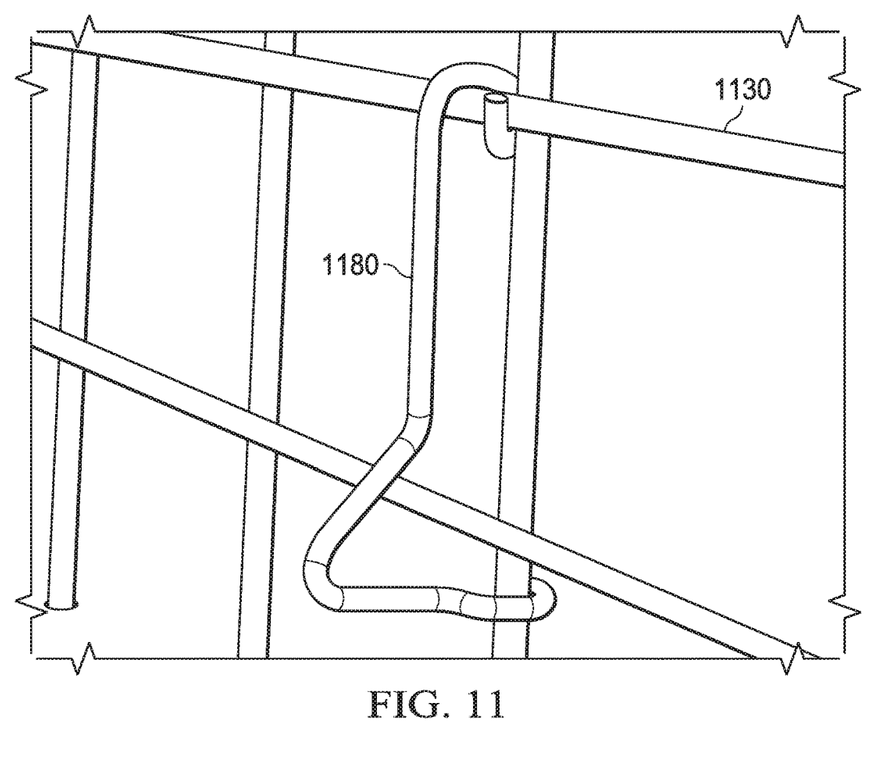
FIG. 11 provides a diagram of a reinforcement cage with spacer installed.

In an example embodiment, as provided in FIG. 11, one or more spacers 1180 are added to reinforcing cage 1130 to ensure proper coverage. Both interior and exterior spacers may be added. If two cages are used, the cages may use spacers to keep the cages at acceptable distances apart. Cage diameters may be adjusted within specification to ensure the additional rebar and lifting eye achieves the proper cover. In an example embodiment, reinforcing cage 1130 inside the concrete pipe has proper cover to the surface of the concrete. To achieve proper cover between the cage and the surface, one or more spacers 1180 are used to hold the cage in place. Spacers may also be used to hold the cages a proper distance apart from one another when multiple cages are used.

Figure 12:
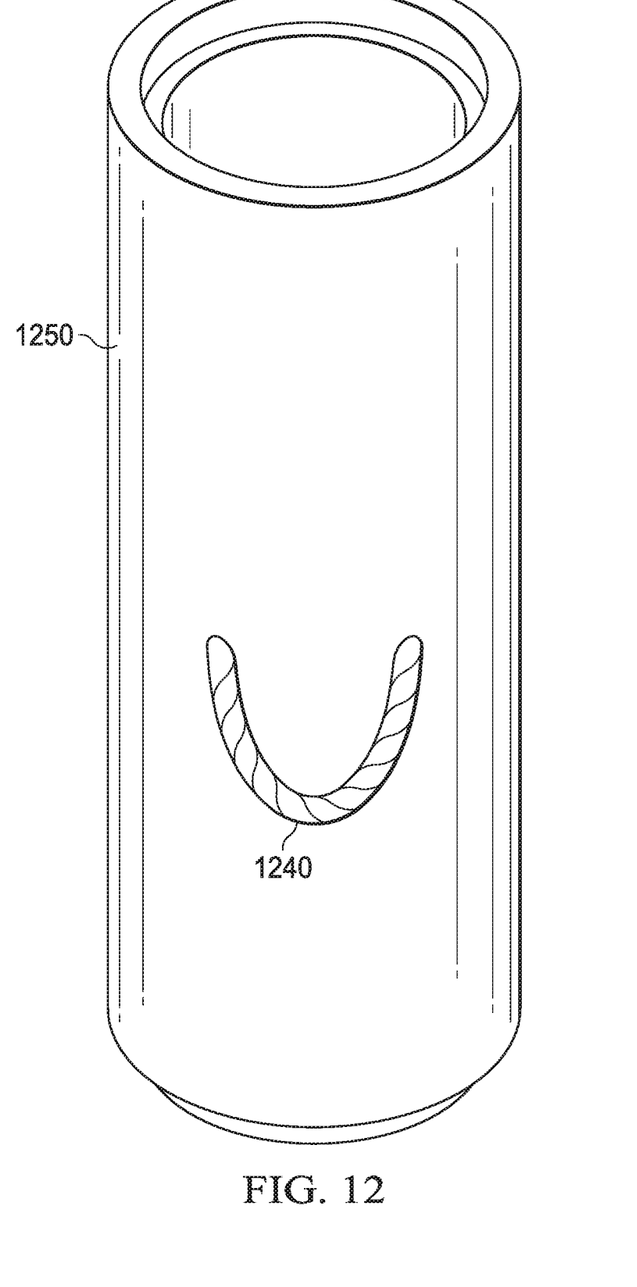
FIG. 12 provides a diagram of a formed concrete structure with lifting cable installed.

After the reinforcement cage is prepared, the reinforcing cage is located within a concrete form (cage may be placed within a form or the form may be placed over the cage), and concrete is poured in the form. In an example embodiment, the concrete form is removed before the concrete is fully set. When the pipe mold is filled and vibrated, a header is applied to the casted pipe and the pipe is stripped from the mold. In an example implementation, the pipe is let to set for more than 2 minutes on a small size pipe, but typically no more than 20 minutes on larger sizes. Once the concrete form is removed, the cable will pop out or spring out of the concrete, leaving a small void where the lifting cable rested while the structure was being cast. Once the lifting cable has popped out, the void left by the cable may be filled. In an example embodiment, the void is filled with the same concrete mix used in the casting of the structure. The void may be filled such that the surface of the structure is flush with no visible indentation present as provided in FIG. 12, with lifting cable 1240 protruding from concrete structure 1250.

Figure 13:
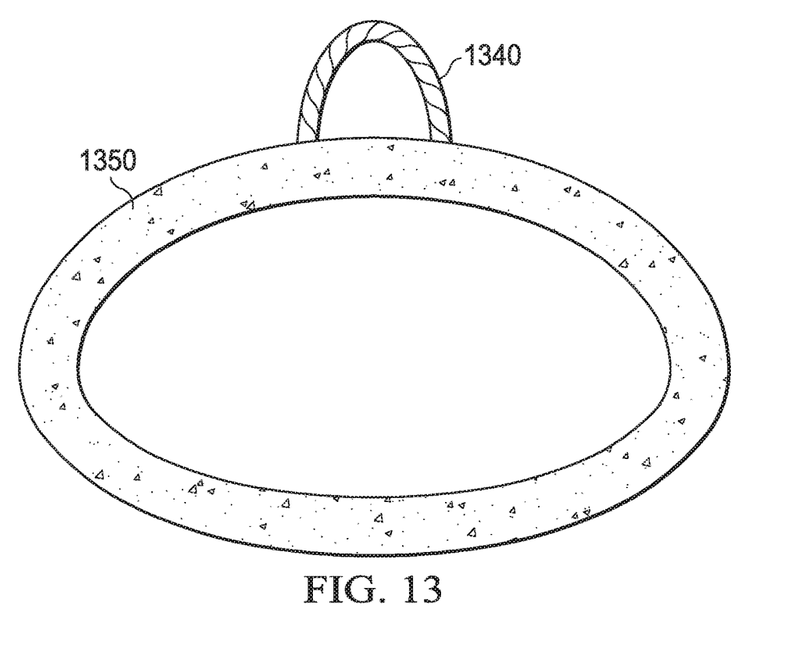
FIG. 13 provides a cross-wise cut-away diagram of an arch concrete pipe with lifting cable installed.

FIG. 13 provides a cross-sectional view of an arch pipe concrete structure with lifting cable 1340 protruding from sidewall 1350.

Figure 14:
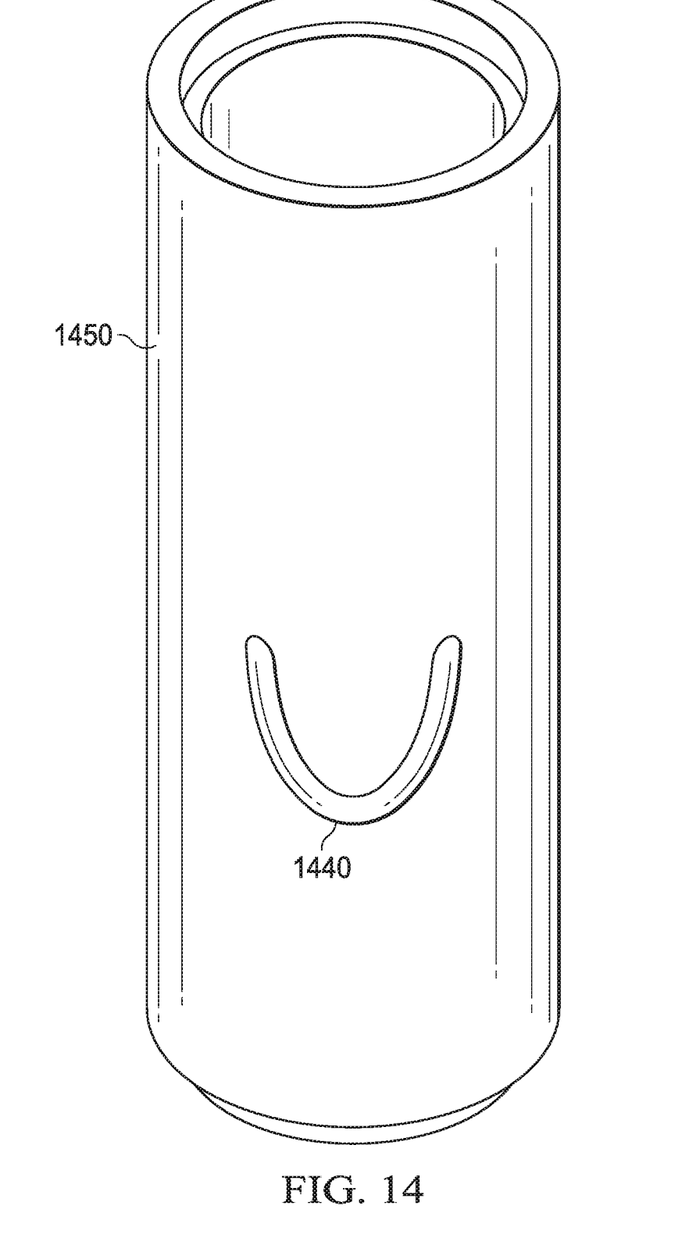
FIG. 14 provides a diagram of a formed concrete structure with a coated lifting cable installed.

FIG. 14 provides an example embodiment of concrete structure 1450 with coated lifting cable 1440. In an example embodiment, the cable is coated with plastic to prevent against water following the cable to the inside of the concrete, and, potentially, to the reinforcing cage. Although plastic is used as an example, other non-limiting example coatings include rubber, powder coating, or any other protective coating. The coating may extend the entire length of the cable or it may only cover the exposed cable that extends from the concrete.

Although the present disclosure has been described in detail, it should be understood that various changes, substitutions and alterations can be made thereto without departing from the spirit and scope of the disclosure as defined by the appended claims.

Therefore, at least the following is claimed:

1. A method of manufacture of a concrete structure comprising: during manufacture of the concrete structure: weaving a lifting cable into a first reinforcing cage with a first set of bars in a first direction and a second set of bars in a second different direction, the lifting cable weaved under and over bars in the first direction and between the bars in the second direction, the lifting cable protruding from the cage to form a loop; attaching rebar at a lifting cable attachment location of the reinforcing cage; locating the reinforcement cage within a concrete form; pouring concrete into the concrete form; removing the concrete form, allowing the loop of the lifting cable to spring out of the poured concrete before the concrete has cured thereby causing a void; and filling the void, such that the surface of the filled void is flush with an existing surface of the poured concrete and such that the lifting cable remains accessible.

2. The method of claim 1, wherein the second direction is a circumferential direction of the reinforcement cage.

3. The method of claim 2, further comprising installing rebar in the first direction and inside the reinforcement cage in the circumferential direction.

4. The method of claim 1, further comprising a second reinforcement cage outside the first reinforcing cage, the lifting cable weaved into the inside of the first reinforcing cage.

5. The method of claim 4, further comprising installing rebar in the first direction and inside the reinforcement cage in the circumferential direction.

6. The method of claim 5, wherein the rebar is installed on the inside of the first reinforcing cage.

7. The method of claim 1, further comprising tying the lifting cable to the first reinforcing cage.

8. The method of claim 7, wherein the lifting cable is tied to the first reinforcing cage where the loop meets the cage and at the end of the lifting cable, on both sides.

9. The method of claim 1, further comprising installing spacers on the reinforcing cage, the spacers configured to provide spacing between the reinforcing cage and the concrete form.

10. The method of claim 1, wherein the reinforcing cage is in the form of one of a round pipe, arch pipe, straight pipe, elliptical pipe, bent pipe, curved pipe, culvert, pullbox, catch basin, retaining wall, manhole sections, and building panel.

11. The method of claim 1, wherein the method comprises dry-casting the concrete structure.

12. An apparatus comprising:
a lifting cable configured to be woven into a reinforcing cage of a concrete structure, the reinforcing cage comprising a first set of bars in a first direction and a second set of bars in a second different direction:
one or more rebar pieces attached to the reinforcing cage at the point of attachment of the lifting cable to the reinforcing cage, the one or more rebar pieces parallel to the first set of bars in the first direction, the lifting cable further configured to be woven in an under and over pattern of the bars and the one or more rebar pieces in the first direction and between the bars in the second direction, the size, length, and spacing of the rebar pieces selected based on the size of the concrete structure.

13. The apparatus of claim 12, wherein the lifting cable is further configured to protrude from the reinforcing cage to form a loop.

14. The apparatus of claim 13, wherein the loop of the lifting cable is coated with a material, the coating material extending at least to the reinforcement cage on both sides of the loop.

15. The apparatus of claim 12, wherein the lifting cable comprises galvanized steel.

16. The apparatus of claim 12, further comprising at least one cable tie configured to attach the lifting cable to the reinforcing cage.

17. The apparatus of claim 16, comprising a plurality of cable ties configured to attach the lifting cable to the reinforcing cage at both points where the loop meets the cage and at the both ends of the lifting cable.

18. The apparatus of claim 12, further comprising a second reinforcing cage and spacers configured to provide spacing between the reinforcing cages.

19. The apparatus of claim 12, wherein the reinforcing cage is in the form of one of a round pipe, arch pipe, straight pipe, elliptical pipe, bent pipe, curved pipe, culvert, pullbox, catch basin, retaining wall, manhole sections, and building panel.

20. A method of manufacture of a concrete structure comprising:
   locating a reinforcement cage within a concrete form;
   attaching rebar to the reinforcement cage at a lifting cable attachment location of the reinforcement cage;
   pouring concrete into the concrete form;
   removing the concrete form, allowing a loop of a lifting cable coming from the reinforcement cage to spring out of the poured concrete before the concrete has cured; and
   filling a void left by the lifting cable springing out, such that the surface of the filled void is flush with an existing surface of the poured concrete and such that the lifting cable remains accessible.

\* \* \* \* \*